United States Patent Office 3,161,619
Patented Dec. 15, 1964

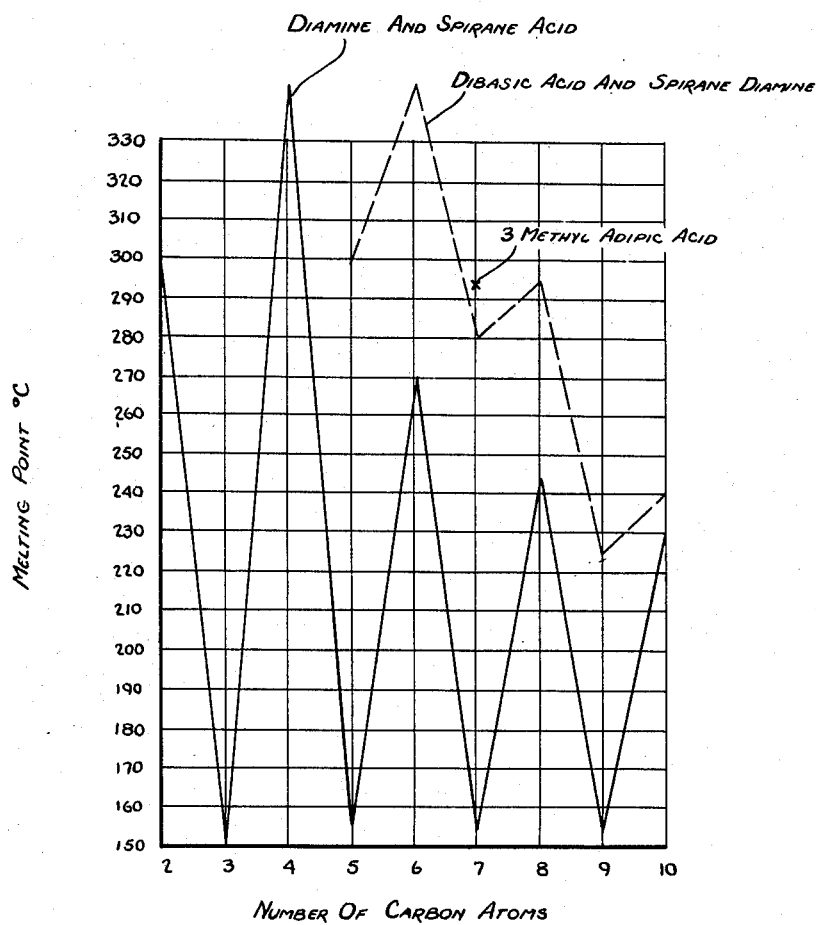

---

3,161,619
POLYMERS WITH SPIRO STRUCTURE
Leonard M. Rice, Baltimore, Md., and John B. Clements, Short Hills, N.J., assignors to Celanese Corporation of America, New York, N.Y., a corporation of Delaware
Filed Dec. 3, 1959, Ser. No. 857,106
18 Claims. (Cl. 260—78)

This invention relates to linear spiro condensation polymers especially valuable as drawn fibers and oriented films by virtue of the introduction of either the spiroheptane ring structure or the 2,4,8,10 tetroxaspiro (5.5) undecane ring structure. In a preferred aspect it relates to linear spiroamide polymers which are formed by condensation of spirodicarboxylic diamine salts.

Some of these salts are prepared from either of two primary spiro compounds, namely from 2,6 dicarboxyspiro (3.3) heptane (Formula I) or 2,6 diaminospiro (3.3) heptane (Formula II):

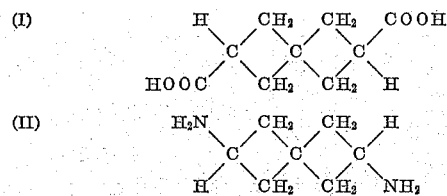

There are also produced in accordance with the invention new polyamides from 3,9 dicarboxylic acids of 2,4,8,10 tetroxaspiro (5.5) undecane. The 3,9 dicarboxylic acids of 2,4,8,10 tetroxaspiro (5.5) undecane are those in which a carboxylic acid group is directly attached to the 3 and 9 positions of the spiro structure through a divalent organic linkage, such as an alkylene linkage. These compounds are novel and constitute part of this invention.

The structure and numbering of the basic spiran structure in 2,4,8,10 tetroxaspiro (5.5) undecane dicarboxylic acids are shown in the following Formula III

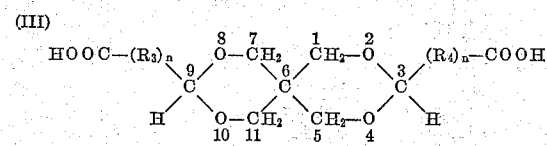

each $R_3$ and $R_4$ is a divalent organic radical such as alkylene and $n$ is an integer from zero to one. The numbering follows chemical nomenclature suggested in the Ring Index, by A.M. Patterson and L. T. Capell, New York, Reinhold Publishing Corp., 1940.

This nomenclature is used in naming the spirostructures throughout this application.

It is seen that a spirocarbon atom is one common to the two ring systems, e.g., carbon 6 of the structure shown above, containing two 5-membered ring systems.

Either the spirodicarboxylic acid of Formula I is reacted with a diamine or the spirodiamine of Formula II is reacted with a dicarboxylic acid and the corresponding spirodicarboxylic diamine salts obtained from the respective Compounds I and II are readily formed in solvent media and are readily separated after precipitation.

Illustratively, arylene diamines or alkylene diamines dissolved in polar solvents such as ethanol, propanol, acetone, etc., are added to the acid of Formula I and on standing at room temperature the salt crystallizes. Crystallization may be aided by cooling and the cooled solution filtered. The salt, after washing with non-polar solvent such as diethyl ether, is dried and polymerized. Similarly, the amine of Formula II is treated in the same type of solvent with dibasic carboxylic acid, e.g., adipic acid or higher dibasic acid and the salt is precipitated, filtered, washed and dried prior to polymerization.

By heating the separated salts from the acids of Formula I above in a polymerization vessel, preferably under a stream of inert gas, there is produced by thermal polymerization above the melting point of the salt, a polymer which can be represented by Formula IV

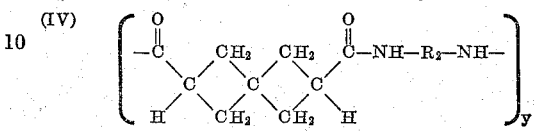

wherein $R_2$ is a divalent organic radical such as alkylene or arylene and $y$ is a whole number of at least 3, indicating the degree of polymerization. By heating the salt from Formula II a polymer represented below by Formula V is obtained from the spirodiamine and the diacid

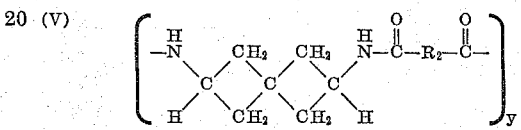

wherein $R_2$ is defined as in Formula IV, and $y$ is a whole number of at least 3 indicating the degree of polymerization.

It is seen that the polymeric product produced from acids represented by Formulas I and III having been produced from the salts of various diamines and spiroheptane dicarboxylic acid or tetroxaspiro diacid respectively necessarily provides polymers in which the spiran rings are adjacent to a carbonyl group (where $n$ is zero in Formula III).

In contrast, the polymerization of the salts from the dibasic carboxylic acids and spiroheptane diamines of Formula II necessarily provides polymers in which the spiran rings are adjacent to an amide nitrogen.

The polyamides of the invention which are produced by polymerization of intermediates having the 2,4,8,10 tetroxaspiro (5.5) undecane ring structure via interaction of the dicarboxylic acid of said 2,4,8,10 tetroxaspiro (5.5) undecane ring structure and an aliphatic diprimary amine are represented by Formula VI

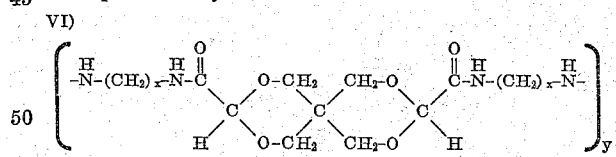

$x$ is a whole number from 2 to 20 and $y$ is a whole number of at least 3 indicating the degree of polymerization.

Dicarboxylic acids of the 2,4,8,10 tetroxaspiro (5.5) undecane ring structure may be prepared by the acetalization of pentaerythritol with two moles of a compound having a functional group which may be converted after acetalization to a carboxy group. Thus, pentaerythritol may be reacted with an aldehydonitrile to produce a 3,9-bis(cyanoalkyl) - 2,4,8,10 - tetroxaspiro (5.5) undecane which may then be hydrolyzed to the corresponding carboxylic acid. Or the pentaerythritol may be reacted with two moles of an ester acetal, such as a dimethoxy methyl acetate, to produce a 3,9-dicarboalkoxy-2,4,8,10-tetroxaspiro (5.5) undecane which may then be hydrolyzed to the corresponding acid.

The acetalization reaction, as may be seen may involve the direct interaction between the pentaerythritol and an aldehyde, or it may involve reaction of the pentaerythritol with an acetal derivative. The reaction is preferably carried out at elevated temperatures between about 75° and 250° C. and most preferably at reflux temperatures. A small amount of an acidic catalyst of the order of from about 0.1 to about 30 weight percent, based on the total weight of reactants, is advantageously included. Mineral acids, such as hydrochloric acid, or strong organic acids, such as p-toluene sulfonic acid, are suitable catalysts. The reaction period may vary from about 2 to about 60 hours.

In addition to the carbonyl group, or derivative, the acetalization reactant should contain another functional group which may be converted by a carboxy group after acetalization. Among the suitable reactants are the nitriles and the esters mentioned above and amides, trihalides, primary alcohols and primary halides.

After the acetalization reaction is complete the preparation of the desired dicarboxylic acid is completed by converting the aforementioned functional group to a carboxy group. The nature of this reaction will depend upon the nature of the functional group. For nitriles, it is convenient to hydrolyze in an aqueous alkaline medium at a temperature from about 80 to 200° C. and for a period between about 12 and 40 hours, followed by neutralization of the reaction product. For esters, it is convenient to hydrolyze with water or an aqueous alkaline medium at elevated temperatures between about 80 and 200° C. for a period between about 12 and 40 hours.

It has been discovered that these linear polymers contain alternating and repeating spiroheptane ring structures or alternating and repeating tetraoxaspiro undecane ring structures respectively and constitute a distinctive and novel class of chemically-resistant, high second order transition temperature, fiber-forming polymers.

The tetroxaspiro ring structure has in common with the spiroheptane ring structure, a stiffening effect in the polyamide chain. The polymer products produced from the spiroheptane ring structures of Formulas I and II have increased second order transition temperatures and similarly high softening points at temperature ranges above 200° C. and a lower degree of interchain hydrogen bonding than is observed in the corresponding polyamide structure in which the spiro ring is not present.

In view of the foregoing relationship, the new polyamides of the invention are thus generically represented as containing the following repeating structure indicated by Formula VII:

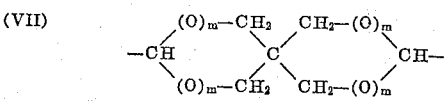

wherein $m$ is an integer from 0 to 1, and subgenerically represented by the Formulas VIII and IX, wherein IX represents the polyamides produced from spiro acids with a diprimary amine.

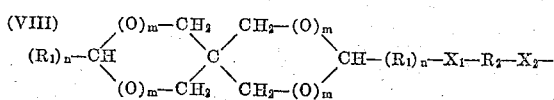

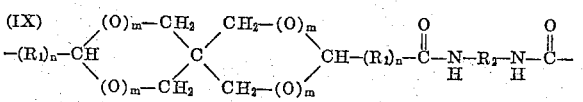

where $X_1$ and $X_2$ (in Formula VIII) are

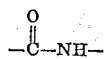

groups, $m$ has the significance as in Formula VII hereinabove, $n$ is an integer from 0 to 6 and $R_1$ and $R_2$ are each a divalent radical particularly one which is selected from the group consisting of arylene, alkylene, alkarylene, aralkylene and organic radicals having hydrocarbon ends linked together by a hetero atom of the group consisting of oxygen and sulfur. The salt of the diamine and the dicarboxylic acid from which the structures under Formulae VII and VIII are derived is represented by the Formula X

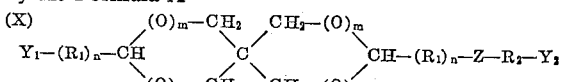

wherein $m$ and $n$ have the same significance as in Formulae VIII and IX hereinabove, where $Y_1$ is selected from —$NH_2$ and COOH and $Y_2$ is selected from —$NH_2$ and —COOH, where $Y_1$ and $Y_2$ are different and Z is a —COOH.$NH_2$ group, and $R_1$ and $R_2$ have the same significance as in Formulae VIII and IX.

The chemical inertness of the novel polyspiroamides is of particular value in providing a combination of characteristically low viscosity of the polymer in solvents such as phenols or cresols coupled with higher melting points and softening points of polymer after fiber formation, than is encountered with conventional polyamides. This represents a combination of properties for spinning which provides for the production of superior polyamide fibers as compared with the conventional polyamides not containing the spiro ring.

Significantly, the resistance to solvents after formation of spiroamide polymers is superior to the solvent resistance of conventional polyamides. It is surprising that a high degree of transparency and water-white color is obtained in the chemically-resistant polyspiroamide products since appreciable color is developed in spinning conventional polyamide fibers particularly if the polyamide is subjected to high temperatures for prolonged periods during spinning.

The new class of linear spiropolyamide has an average molecular length in the linear polymer chain of at least about 1000 Angstrom units, a softening point of above about 200° C. and an increased rigidity in the linear polymer chain.

The number and size of the branches in the alternating chain segments, the degree of flexibility of the main chain, the degree of symmetry of the polymer molecule and the presence of polar groups are structural factors having an important bearing on the physical, chemical and mechanical properties of the polymer.

The side chain substitution is controlled by selection of interacting diamine and interacting dicarboxylic acid for reaction with the basic spiran structures under Formulas I, II and III above and illustrative diamines and diacids are tabulated below:

TABLE I.—ILLUSTRATIVE DIAMINES

Neopentyldiamine
di(α-Aminopropyl)ether
Trimethylenediamine
N-ethyl bis(α-diaminopropyl)amine
N-methyl bis(α-diaminopropyl)amine
Pentamethylenediamine
Hexamethylenediamine
Heptamethylenediamine
Octamethylenediamine
Nonamethylenediamine
Decamethylenediamine
m-Xylylenediamine
2,5-dimethyl piperazine
Diaminoethyl durene
Diaminodiphenyl sulphone
Diaminodiphenyl methane

TABLE II.—ILLUSTRATIVE DIACIDS

Glutaric acid
Adipic acid
3-methyl adipic acid
Suberic acid
Sebacic acid
Azeleic acid
Pimelic acid
Phthalic acid
Isophthalic acid
Terephthalic acid The illustrative diamines under Table I added to the spiro diacids defined hereinabove under Formulae I and III produce salts which may be crystallized either at room temperature or below room temperature when the solution medium for the salt is refrigerated and in those instances where the diamine and the spiroheptane compound are each solid substances, the step of salt formation can occur in situ during polymerization after a simple mixing and heating of the components in molar proportions for salt formation, whereby the salt forms under the inert gas blanket and the salt formed in situ polymerizes to the spiro polyamide in a single salt-forming and polymerizing step.

Similarly, the illustrative diacids under Table II added to the spiro diamines under Formula II in the case where both the acid spiro diamine and the diacid are solids can also be mixed in equal molar proportions for forming the spiro-polyamide in a single salt forming and polymerizing step.

The polymerization of the salt occur by heating under an inert gas blanket or by bubbling a stream of inert gas such as nitrogen or argon through the molten polymer at the polymerization temperature above the melting point of the salt which is formed and below the decomposition temperature of the salt at atmospheric pressure, or the polymerization may be carried out in a molecular still in a thin layer at temperatures above the melting point of the salt and below its decomposition temperature.

The intermediate stage of salt formation and separation from solvent medium is desirable in those cases where either of the salt-forming components is liquid and the purpose served in this case is to insure high purity of the polymerizable mixture to produce a final product which is in high yield and pure form.

Illustrative diamines under Table I include aromatic diamines such as m-xylylenediamine and diaminodiphenyl methane which are weaker bases than the aliphatic diamines used for polymerizing with dibasic acids by conventional polyamide condensation procedures. For producing conventional polyamides, aromatic diamines require higher temperatures than employed for aliphatic diamines as well as requiring specific acidic catalysts such as phosphoric, sulfuric or para-toluene sulfonic acid to accelerate condensation.

In contrast to this difference in reactivity between aliphatic and aromatic diamine reactivity which is encountered in the conventional polyamide condensation, the present procedure which uses the spiran dicarboxy acids of Formulae I and III for reaction with illustrative diamines under Table I achieves polymerization with equal ease and at the same rate whether aromatic diamines or aliphatic diamines are employed to produce the polymers.

The reactivity of the various illustrative diacids under Table II hereinabove with the spiro diamines of Formula II disclose no substantial difference in the rate of polymerization with increasing molecular weight as long as the conditions of polymerization are controlled, i.e., temperature and use of inert gas such as argon or nitrogen to prevent decomposition and the threshold temperature for polymerization above the melting point of the salt is exceeded. In cases where the salt of the spiro diamine and the diacid tends to decompose at the melting point of the salt, a melting point depressant may be added, e.g., a lower melting analogous spiro salt whereby a melt is formed at temperatures below the decomposition point of the salt.

This same procedure is applicable in the case where a salt of the spiro diacid under Formulae I and III is utilized, this salt formed by reaction with a diamine as illustratively shown in Table I.

Certain of the fiber-forming polymers (see Table III) obtained as, for example, by reaction between a spiro diacid and hexamethylenediamine have desirable melting points of 260–270° C., a melting point which is not substantially different from the melting point observed in the same polymer formed from m-xylylenediamine as the diamine. One would expect that aromatic diamines would provide higher melting polymers than aliphatic diamines but this is not the case. Amines such as piperazine would be expected to produce lower melting polymers after condensation with the spiran diacids than the products from aromatic diamines yet the polymers produced from these heterocyclic amines are not melted at 300° C.

The spiran polyamide condensation products of this invention, particularly those which do not produce fibers of optimum properties, are separately useful as modifiers for fibers and as compositions useful in castings. By dissolving these polymers in high-boiling phenols such as cresol, creso-tetra-chloroethane-phenol mixtures to which solvent promoters such as beta-propiolactone, ethylene carbonate or succinic anhydride, are added, cast products may be provided which in the case of infusible, high-melting and inert polymers can be utilized where extreme resistance to temperature as well as chemical agents such as strong acid or alkali is desirable. Thus, these infusible deposited compositions can serve as grouting for corrosion resistant equipment and possess the advantages over inorganic grouting material, e.g., silicate cements, of better flexibility and greater inertness to alkali as well as a lesser tendency to separate due to expansion.

The preference with respect to linear spiroamide polymers suitable for use as drawn fibers and oriented films is associated with the length of the non-spiro component of the polymer.

As illustrated in FIG. 1 of the application which is described in connection with the description of Examples I, II and III, the spiro polymers exhibit a characteristic alteration of melting points depending upon whether the respective non-spiro acid or non-spiro amine component contains an odd number of carbon atoms or an even number of carbon atoms.

When the non-spiro acid or non-spiro amine component employed respectively for the spiro amine and spiro diacid component forming the polymer has a repeating unit which contains an odd number of carbon atoms, which includes in addition to the spiro carbon chain at least 5 carbon atoms and up to about 13 carbon atoms in the diamine or diacid repeating unit, the even numbered acids give products having higher melting points than in the situation where the acid component contains an odd number of carbon atoms. The even number carbon atom diamines produce higher melting products than the odd number carbon atom diamines.

Preferred fiber and film-forming polymers of the linear spiroamides of the invention are achieved due to higher melting characteristics when the reaction diacid or diamine has at least 5 carbon atoms and up to about 13 carbon atoms in the non-spiro reacting moiety.

It is within the contemplation of the present invention to employ mixtures of diamines and mixtures of diacids for copolymer condensation with the spiro diacids and spiro diamines respectively in achieving linear spiroamide polymers. Important advantages result by copolymerization utilizing mixtures of diamines or diacids respectively since the mixture produces copolymers which provide properties intermediate between the properties of the respective constituent homopolymers while at the same time introducing longitudinal disorder and modifying polar linkages of the polymer which tend to bond with one another.

For example, the ethylenediamine salt of spiroheptane diacid is too brittle for the formation of a fiber of optimum properties and the pentamethylenediamine salt produces a polymer which is soft for best fiber formation. Intermediate properties are obtained in the polymers produced by mixing these last-named diamines in equal molar proportions. By mixing these polymers in less than equal molar proportions, there is achieved a degree of brittleness at one of the range represented by the ethylenediamine spiro diacid polymer and a degree of softness at the other end of the range by the pentamethylenediamine spiro diacid polymer. The longitudinal disorder which is achieved in this example by mixture of diamines with spiro diacids causes a decrease in stiffness of the more brittle ethylenediamine polymer and an increase in solubility of the resulting polymer in such solvents as cresol as compared with the more brittle polyamide from the spiro diacid and ethylenediamine.

Similar results are obtained by copolymerizing an aliphatic diamine with an aromatic diamine and the spiro diacid under Formulae I and III in about equimolar proportions. For example, employing a mixture in these proportions of trimethylenediamine and 4,4' diaminodiphenyl methane, there is produced a copolymer which melts below 265° C. in contrast with melting points of about 345° C. for the polymer derived from 4,4' diaminomethyl methane. By using piperazine in the copolymer as the diamine for the polymer formation, there results a product which is more brittle and copolymerization with pentamethylene diamine provides a softening of the piperazine polymer with improved solubility characteristics in solvents such as cresol.

The polymers and copolymers of the present invention have utility where strength, toughness, abrasion resistance, high chemical resistance and high elasticity are required. In the form of textile fibers for knitting of hosiery and underwear, the softer copolymers of the invention are useful in the form of outer garments characterized by wrinkle-resistance and shape retention and stretch resistance. The homopolymers of the invention are useful for electrical uses because of their better thermal stability, better dielectric strength and surface resistivity characteristics. The spiroamide polymers are generally soluble in cresols and dimethyl formamide and may be spun from these solutions or co-spun with conventional fiber-forming polyamide condensation products. The conventional polyamides may be formed in situ with the spiro salt precursor in admixture with conventional amine salt precursor in carrying out a co-condensation prior to the spinning step with the achievement of polymer characteristics intermediate between those of the characteristics of the components separately as explained hereinabove.

For example, the salt, hexamethylene diamine adipate may be combined with from 20 to 80 mol percent of the salt spiro (3.3) heptane-2,6 diamine adipate and heated, as described above to form a combined polyamide. The salts may be formed simultaneously, if desired, by reacting hexamethylene diamine with a mixture of adipic acid and the spiro acid, under the salt-formation conditions described above. Similarly, the salt hexamethylene diamine adipate may be combined with from 20 to 80 mol percent of the salt of hexamethylene diamine and spiro (3.3) heptane-2,6 dicarboxylic acid.

If desired, the spiro-dicarboxylic acids of Formulae I and III may be reacted with a mixture of a diamine and a dihydroxy compound to produce a novel polyester amide, rather than a polyamide. Or, if desired, the diamine may be entirely replaced by the dihydroxy compound to produce a novel polyester. Among the specific dihydroxy compounds which may be used are ethylene glycol, 4,4'-bis-(hydroxymethyl)-biphenyl, 1,4-bis-(hydroxymethyl)-benzene and 1,4-bis-(hydroxymethyl) durene.

Polyesters and polyester amides are prepared from the spiro-dicarboxylic acids by heating the diacids with a glycol or with a mixture of a glycol and a diamine until the evolution of gases is complete. In some cases it is advantageous to use, as a catalyst, a combination of metallic sodium and metallic magnesium.

Also, if desired, polyamides with the desired spiro structure may be prepared from spiro amino acids, rather than from diacids or diamines. The amino acid may be prepared from the diacid in substantially the same manner as the diamine is prepared (as described below) except that one carboxylic acid group is blocked from conversion to the amino group, as for example by partial esterification. The resulting amino ester is then hydrolyzed to an amino acid.

*Preparation of Spiro (3.3) Heptane-2,6-Dicarboxylic Acid*

[Formula I]

Spiro (3.3) heptane-2,6-dicarboxylic acid is prepared by the following sequence of reactions utilizing pentaerythritol tetrabromide as a starting material.

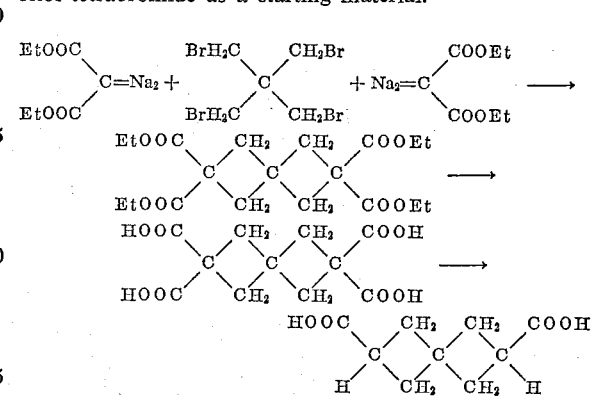

These reactions proceed very readily and produce the spiro diacid in yields up to 80% of theoretical. A specific description of the procedure in this preparation is given in Example I.

*Preparation of Spiro (3.3) Heptane-2,6-Diamine*

[Formula II]

The spiroheptane diamine II, is produced by means of the Schmidt reaction (reaction with sodium azide and sulfuric acid) from the spiroheptane diacid in 95% yield.

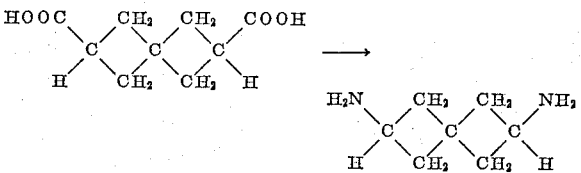

A specific description of the procedure in this preparation is given in Example II.

*Preparation of 2,4,8,10 Tetroxaspiro (5.5) Undecane*

[Formula III]

Pentaerythritol condenses with aldehydes or their acetal derivatives, to give bis-acetals which are spirans. When the aldehyde carries another functional group, such as an ester, nitrile or amino group, a convenient method of synthesis of difunctional spiromonomers is made available. The reaction may be expressed as follows:

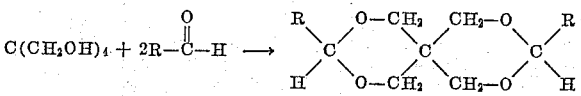

where R is an organic monovalent radical having a functional group convertible to a carboxy or amine group.

Condensation of pentaerythritol with the appropriate aldehyde or acetal has led to the synthesis of new spirodinitriles, such as 3,9-bis-(1,1-diethyl-3-cyanopropyl)-2,4,8,10-tetroxaspiro (5.5) undecane, and new spirodiesters, such as 3,9-dicarbomethoxy-2,4,8,10-tetroxaspiro (5.5) undecane. These compounds were easily hydrolyzed to the corresponding dibasic spiroacids, the spirodinitrile yielding for example 3,9-bis-(1,1-diethyl-3-carboxypropyl)-2,4,8,10-tetroxaspiro (5.5) undecane and the diester yielding 3,9-dicarboxy-2,4,8,10-tetroxaspiro (5.5)

undecane. The dibasic acids were easily salted with various diamines and the salts polymerized by the usual techniques.

The following examples illustrate details of preparation of the basic spiran structures of Formulas I, II and III above, the salts of these structures and polymers.

EXAMPLE I.—PREPARATION OF SPIRO (3.3) HEPTANE-2,6-DICARBOXYLIC ACID

In a 5-liter round bottom flask fitted with a stirrer, reflux condenser and a dropping funnel was placed 2500 ml. of amyl alcohol and 57.5 grams of sodium were added. After the sodium had all reacted, 400 grams of ethyl malonate was added and the mixture refluxed for 15 minutes. While refluxing 200 grams of pentaerythritol tetrabromide were added and the reaction mixture distilled until the vapor temperature reached 128° C., the boiling point of the amyl alcohol. The distillate contained some ethanol formed by the double decomposition of ethyl malonate with amyl alcohol in the presence of sodium. Enough amyl alcohol was added to the reaction mixture to compensate for the amount distilled off and then the mixture was refluxed for 40–50 hours.

Most of the amyl alcohol was removed by distillation and, after addition of some water, the remainder of amyl alcohol was removed by steam distillation. The upper layer containing the ester was separated from the aqueous solution and the solution was extracted twice with ether. After washing the ether extract with water and treating with charcoal the ether was stripped off. The residual oil was saponified at room temperature with a solution of 450 grams of potassium hydroxide in 3750 ml. of alcohol. At the end of 48 hours the potassium salt was filtered off and dissolved in water. The solution was treated with charcoal followed with concentrated hydrochloric acid and then extracted in a continuous ether extraction apparatus for 24 hours.

The ethereal extract was dried and the ether distilled off leaving a mixture of spiroheptane-tetra- and -di-carboxylic acids. This mixture was heated at 200–212° C. for ½ hour until all evolution of carbon dioxide had ceased. The brown mass was crystallized from a liter of water in the presence of charcoal. Eventually the product was recrystallized alternately from ethyl acetate and water to a constant melting point of 212° C. It crystallized in the form of colorless needles.

EXAMPLE II (a) *Preparation of spiro (3.3) heptane-2,6-diamine.*—The spiroheptane acid obtained above was dissolved in 270 ml. of concentrated sulfuric acid in a flask immersed in a water bath at 40° C. With vigorous stirring a 10% chloroform solution of 10% excess over theory of hydrazoic acid was added, the rate of addition being such that the temperature remained below 45° C. Stirring was contained until the evolution of gas ceased and, after cooling, the solution was poured over crushed ice. After separating the chloroform the aqueous solution was made strongly alkaline and steam distilled. The distillate was neutralized with hydrochloric acid and evaporated to dryness on a steam bath. The crude hydrochloride was recrystallized from alcohol and yielded needles melting above 300° C. On distilling the dry hydrochloride salt several times from solid potassium hydroxide under reduced pressure the pure diamine was obtained boiling at 90–92° C. at 12 mm.

(b) *Salts of spiroheptanes of Examples I and II.*—The salts in all cases were prepared by the following general procedure. The appropriate dibasic acid was dissolved in methanol or ethanol and the theoretical quantity of the required diamine dissolved in the same solvent was added with stirring. In cases where crystallization did not start after standing and refrigeration, the mixtures were treated with a small amount of ether to induce crystallization. After crystallization was complete the salts were filtered, washed with an equal mixture of alcohol-ether and finally with ether. In general, the salts precipitated out in pure form, however, in a few cases the salts were recrystallized from an alcohol-ether mixture. These salts are listed in Tables III and IV at the end of Example II.

(c) *Preparation of spiro (3.3) heptane-2,6-diamine salt of pimelic acid.*—To a solution of 16 grams of pimelic acid dissolved in alcohol was added with stirring a solution of 12.6 grams of spiro 3.3 heptane-2,6-diamine dissolved in ethanol. The solution was allowed to stand with refrigeration at a temperature of about 5° C. until crystallization was complete. After several hours the product was filtered and washed with alcohol followed by ether. The salt was recrystallized from alcohol and dried (melting point of 190–191°).

(d) *Polymerization of salts of Examples IIb and IIc.*—In all cases the salts were polymerized by the following general method. Several grams of the particular salt were placed in a small polymerization tube. While maintaining an inert atmosphere of nitrogen over the substance, the tube was slowly heated in an oil bath until the salt had melted and evolution of water had ceased. The temperature was slowly raised to about 10° C. over the melting point of the prepolymer or, if the prepolymer was not a solid, to 275° C. After maintaining the polymer at this temperature for several hours vacuum was applied and held for 1 hour. At this point the heating bath was removed and the tube was allowed to cool in the atmosphere while still maintaining the flow of nitrogen. The polymers prepared and their properties are shown in Tables III and IV at the end of Example II hereinbelow.

(e) *Spiroheptane diamine and pimelic acid salt polymerization.*—The salt of spiroheptane diamine and pimelic acid was placed in a polymerization tube. A stream of nitrogen or other inert gas was passed over the solid and maintained throughout the heating cycle. The solid was gradually heated in an oil bath until melting commenced and evolution of bubbles had started. After the melting of the salt had started the temperature was maintained at 198° C. until completely melted. The temperature was slowly raised to 205° C. where the melted mass turned cloudy and resolidified. The prepolymer thus formed was than heated to 295° C. where it remelted. Heating was continued until the bath temperature was 305° C., at which time a vacuum under 5 mm. was applied for an hour. At this point the heating was stopped and the apparatus allowed to cool. The polymer crystallized as a light yellow to white solid. It has an intrinsic viscosity of 0.6 in metacresol. The polymer was very tough, heat stable, formed nice fibers which possessed cold draw properties and formed tough, flexible transparent, colorless films.

(f) *Spiroheptane diamine and sebacic acid salt polymerization.*—The salt (melting point=178–180°) prepared as in Example IIc hereinabove was polymerized as in Example IIe. The prepolymer melted at about 240° C. and was maintained at 275° C. for 1½ hours and then under vacuum for 2 hours. The tough opaque solid gave nice fibers from the melt.

(g) *Spiroheptane diamine and 3-methyl adipic acid salt polymerization.*—The salt (melting point=198–200°) prepared as in Example IIb was polymerized as in Example IId. The prepolymer melted at about 300° C. and the final temperature was maintained at 305° C. On cooling the polymer was opaque and tough. Fibers could easily be drawn from the melted polymer.

(h) *Spirohepane diamine and azelaic acid salt polymerization.*—The salt (melting point=185–195°) was prepared as in Example IIb and polymerized as in Example IId. The prepolymer melted at about 225° C. and was maintained at 260° C. for 2 hours followed by 1½ hours under vacuum. The polymer on cooling was amorphous and tough. Excellent transparent films and fibers possessing cold draw characteristics could readily be produced from this polymer.

TABLE III.—SALTS OF SPIRO (3.3) HEPTANE-2,6-DICARBOXYLIC ACID

| Diamine | M.P., °C. | Solid Prepolymer | Remarks on Polymer |
|---|---|---|---|
| Trimethylene Diamine | 200–204 | No | Softens at 150° C. |
| Tetramethylene Diamine | 211–212 | Yes | No melt below 345° C. |
| Pentamethylene Diamine | 204–205 | No | Soft at 150° C. |
| Hexamethylene Diamine | 210–211 | Yes | Opaque, nice fibers, m.p.= 260–270. |
| Heptamethylene Diamine | 205–206 | No | Soft at 155° C. |
| Octamethylene Diamine | 195–197 | Yes | M.P. about 245, good fibers. |
| Decamethylene Diamine | 182–183 | Yes | M.P. about 230, good fibers. |
| m-Xylylene Diamine | 200–202 | Yes | M.P., 260–270, good fibers and films. |
| Piperazine | 220–230 | Yes | No melt below 300° C. |
| 2-Methyl piperazine | 209–211 | Yes | Do. |
| 4,4'-diaminodiphenyl sulfone | | No | Weak fibers. |

TABLE IV.—SALTS OF SPIRO (3.3) HEPTANE-2,6-DIAMINE

| Diacid | M.P., °C. | Prepolymer | Remarks on Polymers |
|---|---|---|---|
| Spiroheptane | 230–235 | Yes | Did not melt below 365° C. |
| Adipic | 198–200 | Yes | Melts at 345° C. with decomposition. |
| Pimelic | 190–191 | Yes | M.P.=280° C.; opaque; gives excellent fibers and films. |
| Suberic | 175–180 | Yes | M.P. about 295° C.; opaque; gives fibers, but brittle. |
| Azeleic | 185–195 | Yes | M.P. about 225° C.; gives excellent fibers and films. |
| Sebacic | 178–180 | Yes | M.P. about 240° C.; opaque; nice fibers but weak. |
| 3-methyl adipic | 177–178 | Yes | M.P. about 300° C.; opaque; gives nice fibers. |

EXAMPLE III

This example is submitted to illustrate the details of preparation of certain salts and polymer products as illustrated in Tables III and IV hereinabove and provides desirable preparative details.

(a) *Preparation of the m-xylylene diamine salt of spiro 3.3 heptane-2,6-dicarboxylic acid.*—To a solution of 36.8 grams of the acid dissolved in 375 ml. of ethanol was added with stirring a solution of 27.2 grams of m-xylylene diamine dissolved in 300 ml. of ethanol. The solution was allowed to stand until crystallization was complete and then refrigerated (at a temperature of 5° C.). After an hour, the product was filtered and washed with alcohol, followed by ether. The salt was recrystallized from water alcohol and dried. M.P.=202–203°. Calculated nitrogen=8.7%; found nitrogen=8.65%.

(b) *Polymerization of the salt of IIIa.*—The salt of the spiroheptane acid and m-xylylenediamine was placed in a polymerization tube. A stream of nitrogen or other inert gas was passed over the solid and maintained throughout the heating cycle. The solid was gradually heated in an oil bath until melting commenced and evolution of bubbles had started. After the melting of the salt had started the temperature was maintained at 210° until completely melted. The temperature was slowly raised to 215° where the melted mass turned cloudy and then resolidified at 220°. The prepolymer thus formed was then heated to 260° where it remelted. Heating was continued until the bath temperature was 290°, at which time the vacuum under 5 mm. was applied and maintained for 1½ hours. At this point the heating was stopped and the apparatus allowed to cool. The polymer varied in color from very light yellow to colorless depending on its depth or volume. It had an intrinsic viscosity in metacresol of 0.95 and was amorphous and had a glass transition temperature of over 150°. The polymer can be induced to crystallize at a higher temperature or by steam treatment where it exhibits a crystalline melting point of 250–265° and an ordered X-ray pattern. It may be drawn into fibers and is heat stable at 300°.

(c) *Hexamethylene Diamine and Spiroheptane Dicarboxylic Acid Salt Polymerization.*—The salt (M.P.=210–211°) prepared as in Example IIIa was polymerized as in Example IIIb. On cooling the polymer was white and opaque with an intrinsic viscosity of 0.5. It had a glass transition temperature of over 100° and a crystalline melting point of 260–270°. This polymer is fiber-forming, very tough and heat stable.

Fibers melt spun from this polymer were compared with respect to modulus with fibers melt spun from the polyamide of hexamethylenediamine and adipic acid, both polymers having approximately equivalent crystalline order. The fibers were tested at 23° C. and at both 65% relative humidity and in the wet state. The results are shown below in Table V.

TABLE V

| Fiber | Modulus, g./α | |
|---|---|---|
| | 65% R.H. | Wet |
| Example III | 51.9 | 49.1 |
| From Adipic Acid | 38.9 | 28.0 |

(d) *Decamethylene diamine and spiroheptane dicarboxylic acid salt polymerization.*—The salt (M.P.=183–184°) prepared as in Example IIIa was polymerized as in Example IIIb. On cooling the polymer had an intrinsic viscosity of 0.7 in metacresol and was white, opaque and tough. It formed nice fibers. It had a melting point of 225–230° and a second order transition temperature of over 80°. It possessed good heat stability.

(e) *Heptamethylene diamine and spiroheptane dicarboxylic acid salt polymerization.*—The salt (M.P.=204–206°) was prepared as in Example IIIa and polymerized as in IIIb. The polymer was amorphous and melted at 155–170°. It would draw fibers and had an intrinsic viscosity of 0.51. It had good heat stability but could not be made to crystallize.

In the first case of Formula I where the polymers are derived from spiro (3.3) heptane-2,6-dicarboxylic acid an extensive study has shown a distinct relationship between the nature of the diamine and the melting point of the polymer. It has been demonstrated in the series of homologous alkylene groupings where $x$ is a number from 2 to 10 there is a regular pattern in the melting point properties (see FIGURE 1). All the $\alpha,\omega$, alkylene diamines containing an odd number of carbon atoms produced amorphous polymers softening or melting below 160° C. On the other hand, the $\alpha,\omega$, alkylene diamines containing an even number of carbon atoms produced polymers which were much higher melting.

Starting with ethylene diamine the polymerization of this salt formed a solid prepolymer which melted around 295° C. The next even carbon containing diamine, putrescine, on polymerization formed a solid prepolymer which, however, did not melt at 345° C. The polymerization of the hexamethylene, octamethylene and decamethylene salts all proceeded in a very satisfactory way. These salts after first melting resolidified forming a prepolymer, which could then be remelted and easily further polymerized. The hexamethylene diamine polymer has a crystalline melting point of 260–270° C. and a glass transition temperature of about 110° C. An amorphous sample of this material on melt spinning from a test tube produces an amorphous unoriented structure. Hot drawing introduces orientation and also some crystallization which may also be introduced by annealing. Octamethylene and decamethylene diamine produced polymers which were opaque and melted around 245° C. and 230° C., respectively. The three polymers from $C_6$, $C_8$ and $C_{10}$ diamines all easily formed fibers which possessed highly desirable qualities. When the carbon chain of the diamine chain was branched or a hetero atom such as oxygen or nitrogen was introduced into the chain the melting point of the polymer was decreased and the product was a glass.

Polymerization of the salt of m-xylylenediamine and spiroheptane - 2,6 - dicarboxylic acid proceeded very smoothly forming first a solid prepolymer which remelted at around 265° C. This polymer has a crystalline melting point of 245° C. and a second order transition temperature of about 160° C. At room temperature the polymer as obtained was a glass which could be induced to crystallize by heat. When melt spun from a test tube the fibers from this polymer are a glass and give an amorphous unoriented pattern. The polymer and the cold drawn fiber was crystallized by annealing with steam at a pressure of 15 p.s.i.g. to give a nice oriented X-ray pattern.

In the second case of Formula II, where the polymers are derived from spiro (3.3) heptane-2,5-diamine, the spiroheptane dicarboxylic acid when salted and polymerized with this diamine readily gave a prepolymer. It did not melt at 365° C. Adipic acid formed a prepolymer which remelted at 345° C. with decomposition. In the cases of pimelic acid and azelaic acids, although they are acids containing an odd number of carbon atoms, these gave very desirable polymers with good fiber and film-forming characteristics. The $C_7$ acid derived polymer melted at 280° C. and was opaque, whereas the $C_9$ derived polymer melted around 225° C. Although these polymers melted also lower than their even carbon homologues their melting points were still within a very useful range, and better in this respect than the polymers produced from aliphatic diamines containing an odd number of carbon atoms. The use of suberic and sebacic acids in this type of polymer produced products melting at 295° C. and 240° C. respectively. These opaque white polymers produced fibers which were not as strong as those of the odd carbon acids which produced excellent fibers under comparable experimental conditions of preparation and treatment. A methyl branching in the carbon chain of adipic acid resulted in a somewhat decreased melting point as compared with the polymer produced from adipic acid, although it was somewhat higher than that of the polymer produced from pimelic acid. Employing the 3-methyl adipic acid salt of the spiran diamine resulted in a prepolymer which remelted around 300° C. This polymer was opaque and gave nice fibers.

A comparison of these spiran-containing polymers with the usual type of polyamide polymers shows that they have a greater degree of stiffness in the polymer chain and a lesser degree of hydrogen bonding.

EXAMPLE IV

This example illustrates the preparation of a 2, 4, 8, 10-tetroxaspiro (5.5) undecane dicarboxy acid by reaction scheme I.

*Reaction Scheme 1*

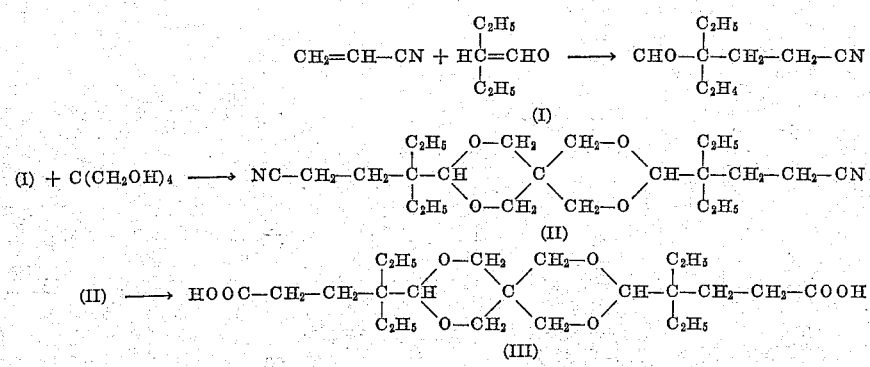

3.9 - bis(1,1 - diethyl - 3 - carboxypropyl) - 2,4,8,10-tetroxaspiro (5.5) undecane was prepared by the reaction scheme I. 2-ethylbutyraldehyde was cyanoethylated to 2-(cyanoethyl)-2-ethylbutyraldehyde which condensed with pentaerythritol to give the dinitrile. Diacid was prepared in good yields by hydrolysis of this dinitrile. The details of scheme I are set forth below.

A mixture of 81.5 grams (0.60 mole) of commercial pentaerythritol, 186.0 grams (1.21 mole) of 2-($\beta$-cyanoethyl)-2-ethylbutyraldehyde, 3.54 grams of p-toluenesulfonic acid monohydrate and 450 ml. of toluene was refluxed under a Dean-Stark water trap for 40 hours. The theoretical amount of water (21.6 ml.) was collected. The reaction mixture was neutralized with sodium methoxide solution, filtered using a diatomaceous earth filter aid, and solvent removed under reduced pressure. On cooling, the residual dark red oil solidified to a brown product weighing 234.6 grams (96.2%), M.P. 81–85.5° C. One recrystallization from methanol using charcoal yielded 172.5 grams melting at 86–88° C. This product was hydrolyzed without further purification. A small portion was recrystallized several times from methanol as colorless needles melting at 89.5–90.5° C. Analysis calculated for $C_{23}H_{38}N_2O_4$: C, 67.93; H, 9.43. Found: C, 67.70; 67.81; H, 9.52; 9.55.

A solution of 33.4 grams (0.082 mole) of 3,9-bis-(1,1-diethyl-3-cyanopropyl)-2,4,8,10 - tetroxaspiro (5.5) undecane, 30 grams of potassium hydroxide, 15 ml. of water and 85 ml. of ethyl Cellosolve was refluxed for 18 hours while an air stream was passed through the mixture. The clear red reaction product was diluted with 350 ml. of water and neutralized with concentrated hydrochloric acid to precipitate a brown, taffy-like product which crystallized on cooling and kneading. The product was filtered, dried at 60° C. and found to weigh 34.1 grams (93.8%). It melted at 162–164° C. Several recrystallizations from methanol resulted in colorless flakes melting at 164–165° C. Acid equivalent: Calculated 4.50 meq./g. Found 4.51 meq./g. Analysis calculated for $C_{23}H_{40}O_8$: C, 62.14; H, 9.07. Found: C, 61.6; 61.7; H, 8.90; 9.03.

The diacid was soluble in many common solvents and could be recrystallized from ethanol as well as methanol.

3,9 - bis - (1,1 - diethyl - 3 - cyanopropyl) - 2,4,8,10-tetroxaspiro (5.5) undecane was also prepared by refluxing a mixture of 81.5 grams (0.60 mole) of pentaerythritol, 186.0 grams (1.21 mole) of 2-(β-cyanoethyl)-2-ethylbutyraldehyde, 3.45 grams of p-toluene-sulfonic acid monhydrate and 450 ml. of toluene under a water separating trap for 40 hours. The reaction mixture was neutralized with sodium methoxide, solvent removed and the resulting oil cooled to solidify a brown product weighing 234.6 grams (96.2%), melting at 81–85° C. On recrystallization from methanol yielded 172.5 grams of material melting at 86–88° and was hydrolyzed without further purification. A small portion was recrystallized from methanol to give a sample melting at 89.5–90.5° C. Analysis calculated for $C_{23}H_{38}N_2O_4$ C, 67.93; H, 9.43. Found: C, 67.70; 67.81; H, 9.52; 9.55.

EXAMPLE V

Pentaerythritol was similarly acetalized with 1,1-diethoxy-3-cyanopropane to produce 3,9 - bis - (2 - cyanoethyl)-2,4,8,10-tetroxaspiro (5.5) undecane which had a melting point of 73–74° C. after several recrystallizations from ethanol.

This compound was hydrolyzed, as above, to produce 3,9 - bis - (2 - carboxyethyl) - 2,4,8,10 - tetroxaspiro (5.5) undecane which was recrystallized from water as needle-like crystals melting at 207–208° C.

The dimethyl ester of this diacid was prepared by overnight refluxing with methanol using sulfuric acid as a catalyst. Recrystallization from methanol produced thick, colorless needles melting at 92–93° C.

EXAMPLE VI

Pentaerythritol was similarly acetalized with 2,2-dimethyl-4-cyanobutyraldehyde to produce 3,9-bis-(1,1-dimethyl-3-cyanopropyl)-2,4,8,10-tetroxaspiro (5.5) undecane which had a melting point of 103–104° C. after recrystallization from methanol.

This compound was hydrolyzed, as above, to produce 3,9 - bis - (1,1 - dimethyl - 3 - carboxypropyl) - 2,4,8,10-tetroxaspiro (5.5) undecane which was recrystallized from hot dimethyl formamide to produce brown crystals melting at 257–258° C. The diacid was insoluble in most solvents, although it could be partially dissolved in hot ethyl Cellosolve and hot ethylene glycol in addition to hot dimethyl formamide.

The dimethyl ester prepared as above, melted at 136–136.5° C.

EXAMPLE VII

This example shows preparation of another 2,4,8,10-tetroxaspiro (5.5) undecane dicarboxy acid by reaction scheme II below.

*Reaction Scheme II*

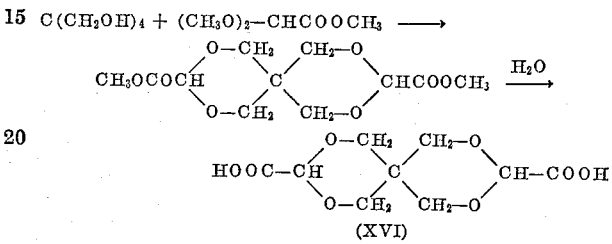

Reaction Scheme II shows the reaction scheme used to prepare 3,9-dicarboxy-2,4,8,10-tetroxaspiro (5.5) undecane (XVI). Pentaerythritol was condensed with methyl dimethoxyacetate using aqueous hydrochloric acid to give diester in good yields as verified by saponification value and neutralization value. Investigation revealed the diester to be extremely susceptible to hydrolysis which caused free acidity to appear, and saponification values corresponding to 99.75% of theoretical were obtained. In order to characterize this new diester, three derivatives were prepared and satisfactorily analyzed. They are: the diamide, the bis-N-benzylamide and the dihydrazide.

Diacid (XVI) resulted in good yields from the aqueous hydrolysis of the diester. Careful purification by aqueous recrystallization gave an acid with the correct neutral equivalent. The acid decomposed on melting with gas evolution.

Details are given below.

A mixture of 272 grams (2.0 moles) of commercial pentaerythritol, 590 grams (4.4 moles) of methyl dimethoxyacetate (saponification values indicated purity of 99–100% and it was used without further purification) and 500 ml. of concentrated hydrochloric acid was refluxed for three hours. The reaction mixture was transferred to a large evaporating dish and left overnight on a steam bath. On treating the resulting thick oil with 400 ml. of methanol a colorless semi-solid cake was formed. Recrystallization of the entire cake from methanol resulted in 291.9 grams (52.8%) of colorless solid melting at 133.5–135.5. One further recrystallization from methanol gave 245.7 grams (44.5%) of long colorless needles melting at 135.5–136.0° C. Saponification equivalent: Calculated 7.240 meq./g. Found: 7.225 and 7.220 meq./g. This corresponds to a purity of 99.75%. Analysis calculated for $C_{16}H_{16}O_8$: C, 47.83; H, 5.84. Found: C, 47.4; 47.6; H, 5.81; 5.96.

The corresponding diamide was prepared by treatment of the above diester by stirring with excess concentrated aqueous ammonium hydroxide. The sample was prepared for analysis by recrystallizing from water as colorless flakes. The melting point was above 300° C. Analysis calculated for $C_9H_{14}N_2O_6$: C, 43.87; H, 5.73; N, 11.38. Found: C, 44.0; 43.7; H, 6.01; 5.78; N, 11.25; 11.29.

The bis-N-benzylamide was prepared by refluxing 1 gram of the above diester with 5 ml. of benzylamine for one hour using 0.2 gram of $NH_4Cl$ as a catalyst.

Several recrystallizations from ethanol yielded colorless flakes melting at 180–181° C. Analysis calculated for $C_{23}H_{26}N_2O_6$: C, 64.75; H, 6.15; N, 6.57. Found: C, 64.6; 64.5; H, 6.18; 6.30; N, 6.49; 6.53.

The dihydrazide was prepared from 1 gram of the diester and 1 ml. of 85% hydrazine hydrate solution. The mixture was refluxed for 10 minutes and then refluxed for an additional 2 hours after the addition of 15 ml. of absolute ethanol. The dihydrazide was recrystallized from aqueous methanol as colorless flakes melting at 208–210° C. Analysis calculated for $C_9H_{16}N_4O_6$: N, 20.29. Found: N, 20.10; 20.19.

A solution of 55.3 grams (0.20 mole) of 3,9-dicarbomethoxy-2,4,8,10-tetroxaspiro (5.5) undecane in 165 ml. of water was refluxed for two hours and allowed to stand overnight. Upon cooling 39.5 grams (79.5%) of colorless crystals, melting at 233.5–234.5° C., precipitated. Two recrystallizations from water raised the melting point to 234–234.5° C. Acid equivalent: Calculated 8.06 meq./g. Found: 8.06 meq./g. Analysis calculated for $C_9H_{12}O_8$: C, 43.53; H, 4.88. Found: C, 43.5; 43.4; H, 4.80; 4.81.

EXAMPLE VIII

Pentaerythritol was similarly acetalized with ethyl β,β-diethoxypropionate to produce 3,9-biscarbethoxymethyl-2,4,8,10-tetroxaspiro (5.5) undecane in accordance with the following procedure:

A mixture of 36.0 g. (0.19 mole) of ethyl β,β-diethoxypropionate, 11.9 g. (0.086 mole) of pentaerythritol and 0.2 g. of p-toluene sulfonic acid monohydrate was refluxed for eight hours. Upon cooling a pasty white solid appeared. This material was recrystallized from ethanol to give 16.6 g. (58.3%) of colorless crystals melting at 79.5–81°. Another recrystallization from ethanol raised the melting point to 81.5–82°.

Analysis calculated for $C_{15}H_{24}O$: C, 54.21; H, 7.28. Found: C, 54.3; 54.4.

This compound was hydrolyzed to produce 3,9-biscarboxymethyl-2,4,8,10-tetroxaspiro (5.5) undecane using the following procedure:

A mixture of 9.56 g. (0.029 mole) of 3,9-biscarboxymethyl-2,4,8,10-tetroxaspiro (5.5) undecane, 7 g. of potassium hydroxide and 50 ml. of water was refluxed for 2½ hours. The yellow solution was charcoaled, cooled and acidified with concentrated hydrochloric acid. A colorless solid, weighing 6.13 g. (77.0%) and melting at 220–221° (gas evolution), was collected. Recrystallization from water did not raise the melting point.

Analysis calculated for $C_{11}H_{16}O_8$: C, 47.83; H, 5.84. Found: C, 47.9, 47.7; H, 5.90, 6.04.

EXAMPLE IX.—SALT PREPARATION AND POLYMERIZATION PROCEDURES FOR INTERMEDIATES OF EXAMPLES IV TO VIII

The general procedure for salt preparation was to add an equivalent amount of diamine dissolved in absolute ethanol to a hot solution of the dibasic acid in absolute ethanol. Generally, a white precipitate formed immediately and was filtered while still hot, washed with ether and used without further purification. In cases where the precipitate did not appear immediately the reaction mixture was allowed to stand overnight at room temperature in order to separate the salt. A pH determination on a one per cent aqueous solution of some of the salts showed them to be essentially neutral, falling within the 6.5–7.5 pH range. Data on these salts are shown in Table VI hereinbelow.

The general procedure for salt polymerization was to charge a glass tube polymerization apparatus with two to five grams of salt, purge thoroughly with nitrogen and heat in an oil bath while maintaining a slow stream of nitrogen through the reaction system. The salts were melted at a temperature as near as possible to their melting points and in no cases were allowed above 15° in excess of this temperature. As soon as evolution of water slowed the nitrogen inlet was closed and a vacuum below five millimeters was applied. These conditions were maintained until water was no longer evolved and then for an additional hour to complete the polymerization. The reaction time required was four to six hours. Polyamides from salt polymerization are shown in Table VII.

Diacid (XVI) was salted with hexamethylenediamine, and decamethylenediamine. On melting, the hexamethylenediamine salt decomposed to give a thermoplastic polymeric product. The decamethylenediamine salt melted with little or no decomposition to give a light yellow polymer.

The melting point of these salts is of importance in determining the course of polymerization. In cases where the salt melting point is near that of the acid (e.g. hexamethylenediamine where the salt melting point is 233–4° vs. acid melting point of 233.5–235.5°) decomposition during polymerization is a serious problem while in cases where the salt melting point is lower than the melting point of the acid (e.g. decamethylenediamine where the salt melts at 204–206°) little or no decomposition takes place. If concurrent acid decomposition occurs during the initial stage of the salt polymerization new reaction species are formed which alter the course of polymerization giving rise to decomposed products. The acid of Reaction scheme I and its salts do not decompose on melting and the salts give completely colorless polymers.

To a solution of 13.32 grams (0.03 mole) of 3,9-bis-(1,1 - diethyl - 3 - carboxypropyl) - 2,4,8,10 - tetroxaspiro (5.5) undecane in 75 ml. of hot absolute ethanol was added a solution of 4.08 grams (0.3 mole) of m-xylylenediamine in 25 ml. of absolute ethanol. Overnight standing at room temperature resulted in 16.31 grams (93.8%) of colorless salt melting at 164–5°. This material was used without further purification.

The salt of m-xylylenediamine and 3,9-bis-(1,1-diethyl-3-carboxypropyl)-2,4,8,10-tetroxaspiro (5.5) undecane was placed in a polymerization tube and purged thoroughly with nitrogen or other inert gas and a slow stream was maintained throughout the reaction cycle. The solid was heated in an oil bath until melting commenced and evolution of bubbles had started. After melting of the salt had started the bath temperature was maintained at 185° throughout the reaction cycle. When the evolution of bubbles slowed a vacuum under 5 mm. was applied and continued for the remainder of the cycle. When evolution ceased the heating bath was removed and the apparatus allowed to cool. The entire reaction time was 2 hours. The polymer was completely colorless, non-crystalline and had excellent optical clarity. The polymer softens at 125° and melts between 140–150°. It may be drawn into fibers from the molten state.

The salt of hexamethylenediamine and 3,9-bis-(1,1-diethyl-3-carboxypropyl)-2,4,8,10-tetroxaspiro (5.5) undecane was prepared in accordance with the above procedure and polymerized. The polymer was clear, colorless, non-crystalline and melted at 110–130° C. It was drawn into fibers from the molten state.

The salt (melting point 190–192°) of piperazine and 3,9 - bis - (1,1 - diethyl - 3 - carboxypropyl) - 2,4,8,10-tetroxaspiro (5.5) undecane was also prepared in accordance with the above procedure and polymerization produced a clear, colorless, non-crystalline polymer melting at 110–114° C. which was drawn into fibers from the molten state.

The salt (melting point 202–204°) of decamethylenediamine and 3,9-dicarboxy-2,4,8,10-tetroxaspiro (5.5) undecane was also prepared in accordance with the above procedure and polymerization produced a clear, light yellow and non-crystalline polymer melting at 125–140° C. Fibers were drawn from the molten state.

Equivalent amounts of m-xylylenediamine and 3,9-dicarbomethoxy-2,4,8,10-tetroxaspiro (5.5) undecane were heated in a nitrogen atmosphere to 165° C. A vacuum under 5 mm. was then applied and the reaction allowed to proceed for 18 hours. The apparatus was cooled and the polymer extracted. The polymer was clear, light green in color and non-crystalline, melting at 188–195° C. Fibers were drawn from the molten state.

The polyamide of hexamethylenediamine and 3,9-dicarboxy - 2,4,8,10 - tetroxaspiro (5.5) undecane was prepared as in the above example. The polymer was clear, light yellow in color and non-crystalline. It melted at 140–160°. Fibers were drawn from the molten state.

In order to prepare suitable polyamides from XVI and hexamethylenediamine and m-xylylenediamine, an alternate synthesis was used and the condensation of diester with the diamines proved to be suitable and the method was used to prepare the otherwise inaccessible polyamides from the diacid and hexamethylenediamine and m-xylylenediamine.

All polyamides thus prepared were clear, slightly colored, rather low melting products. In spite of their rather low inherent viscosity in m-cresol all of these polymers formed fibers from their melts and provided plastic products suitable for coatings, e.g., from cresylic acid solutions on to metal (e.g. black iron) base.

The following tables show data on the salts and polyamides prepared as described above and other salts, polyamides and polyesters similarly prepared from the diacids of Examples IV to VIII or their derivatives.

Table VI hereinbelow provides pertinent data on polyamide salts.

Table VII hereinbelow furnishes pertinent data on polyamides from salts.

TABLE VII.—POLYAMIDES FROM SALTS

| Salt [A] | Polymer properties | | |
|---|---|---|---|
| | M.P.,[B] °C. | I.V.[C] | Appearance [D] |
| IV, HMD | 110–130 | 0.25 | Clear, colorless somewhat brittle. |
| IV, PIP | 110–115 | 0.13 | Clear, colorless, brittle. |
| IV, MXD | 140–148 | | Clear, colorless, moderately tough. |
| V, MXD | 123–130 | 0.34 | Clear, orange-red. |
| VI, HMD | 113–126 | 0.24 | Clear, light yellow. |
| VI, MXD | 135–150 | 0.30 | Clear, slightly green. |
| VII, HMD | 165–180 | 0.45 | Very dark, clear, tough. |
| VII, DMD | 125–140 | 0.49 | Clear, light yellow, fairly tough. |
| VIII, HMD | 105–120 | 0.20 | Clear, dark. |
| VIII, DMD | 73–87 | 0.12 | Do. |
| VIII, PIP | 127–141 | 0.06 | Do. |
| VIII, MXD | 131–140 | 0.11 | Clear, orange. |

[A] HMD, hexamethylenediamine; DMD, decamethylenediamine; PIP, piperazine; MXD, m-xylylenediamine; IV, VI, VII and VIII refer to the dicarboxylic acids of the above examples, so designated.
[B] Melting point, as determined on a hot stage, was indefinite and occurred over a range.
[C] In m-cresol.
[D] All of these polyamides formed fibers from their melts.

Table VIII hereinbelow gives pertinent data regarding polymers of polyamides from 3,9-dicarbomethoxy-2,4,8,10-tetroxaspiro (5.5) undecane.

TABLE VI.—POLYAMIDE SALTS

| Acid | Diamine [A] | | | | | | | |
|---|---|---|---|---|---|---|---|---|
| | HMD | | DMD | | PIP | | MXD | |
| | Percent Yield | M.P., °C. | Percent Yield | M.P., °C. | Percent Yield | M.P., °C. | Percent Yield | M.P., °C. |
| Example IV | 99 | [B] 198–9 | | | 78 | [B] 190–2 | 94 | [B] 164–5 |
| Example V | 83.2 | [C] 214–15 | 88.8 | [C] 220–1 | 70.2 | [C] 203–6 | | [C] 194–5 |
| Example VI | 55.2 | 205–6 | | | | | 62.3 | 203–5 |
| Example VII | 87 | [B,C] 233–4 | 94 | [B] 204–6 | | | | |
| Example VIII | 86.7 | [B,C] 219–20 | 66.7 | [B,C] 204–5 | 96.5 | [B,C] 215–16 | 98.0 | [B] 210–12 |

[A] HMD, hexamethylenediamine; DMD, decamethylenediamine; PIP, piperazine; MXD, m-xylylenediamine.
[B] Melting point determined in a sealed capillary under nitrogen.
[C] Some decomposition on melting.

TABLE VIII.—POLYAMIDES FROM 3,9-DICARBOMETHOXY-2,4,8,10-TETROXASPIRO (5.5) UNDECANE

| Diamine [a] | Reaction Conditions | | | Polymer Properties | | | |
|---|---|---|---|---|---|---|---|
| | Bath Temp., °C. | Time To Vacuum | Time Under Vacuum | M.P.,[b] °C. | I.V.[c] | Appearance | Nature of Fibers |
| HMD | 220 | 140 | 20 min | 140–160 | 0.30 | Clear, light yellow, fairly tough. | Easily formed, no cold draw. |
| MXD | [d] | 40 | Overnight | 180–190 | 0.15 | Clear, light green, somewhat brittle. | Do. |

[a] HMD, hexamethylenediamine; MXD, m-xylylenediamine.
[b] Melting point, as determined on a hot stage, was indefinite and occurred over a range.
[c] In m-cresol.
[d] At 180° when vacuum applied; gradually raised to 250° for overnight holding.

In Table IX hereinbelow, there is submitted polymer solubility data.

TABLE IX.—POLYMER SOLUBILITY

| Polymer [a] | Solvent | | | | | |
|---|---|---|---|---|---|---|
| | Acetone | $CH_3OH$ | m-Cresol | $CHCl_3$ | DMF | HOAc |
| A, HMD | Swollen Insol | Part sol | Sol | Sol | Sol | Sol. |
| A, Pip | Sol | Swollen Insol | Sol | Sol | Sol | Sol. |
| A, MXD | Swollen Insol | Swollen Insol | Sol | Sol | Sol | Sol. |
| B, DMD | Insol | Insol | Sol | Mostly Sol | Mostly Sol | Sol. |
| B, HMD | Insol | Swollen Insol | Sol | Mostly Sol | Sol | Sol. |
| BHB B | Swollen Insol | Insol | Sol | Sol | Sol | Swollen Insol. |

[a] A, 3,9-bis(1,1-diethyl-3-carboxypropyl)-2,4,8,10-tetroxaspiro (5.5) undecane; B, 3,9-dicarboxy-2,4,8,10-tetroxaspiro (5.5) undecane; HMD, hexamethylene-diamine, Pip, piperazine; MXD, m-xylylenediamine; DMD, decamethylenediamine; BHB, 4,4-bis-(hydroxy-methyl)-biphenyl.

EXAMPLE X

A polyester was prepared by reacting 3,9-dicarbomethoxy-2,4,8,10-tetroxaspiro (5.5) undecane with a tenfold excess of ethylene glycol. A small piece of sodium and a small piece of magnesium were added to the reaction mixture as a catalyst. The mixture was maintained under vacuum overnight in an oil bath at a temperature of 210° C. A colorless, partly crystalline polymer was obtained having a melting point (determined on a hot stage) of 155–160° C. Fibers were drawn from the melt.

In accordance with another aspect of the invention, commercial pentaerythritol which contains dipentaerythritol as an impurity may be purified by treating the commercial composition with a low molecular weight acetal of an aldehyde and an alkanol, the alkanol containing, for example, up to 10 carbon atoms. The acetals contemplated have the formula $RCH(OR')_2$, wherein R, for example, is alkyl or alkoxyalkyl, e.g. containing up to 10 carbon atoms or aryl e.g. phenyl, naphthyl or o-, m- or p-phenylphenyl or these latter radicals substituted with alkyl or alkoxy e.g. containing up to 6 carbon atoms, such as o-, m-, and p-tolyl, or aralkyl e.g. benzyl or phenylethyl, or aralkenyl e.g. styryl, and R' is alkyl containing up to 6 carbon atoms.

Examples of specific acetals are acetaldehyde diethylacetal, i.e., "acetal" acetaldehyde dimethylacetal, acetaldehyde di(n-hexyl) acetal, propionaldehyde dimethylacetal, propionaldehyde diethylacetal, butyraldehyde dimethylacetal, butyraldehyde diethylacetal, benzaldehyde dimethylacetal, benzaldehyde diethylacetal, p-tolualdehyde dimethylacetal, p-tolualdehyde diethylacetal, phenylacetaldehyde dimethylacetal, cinnamaldehyde dimethylacetal and cinnamaldehyde diethylacetal.

The acetal reacts with the pentaerythritol to form a derivative of 2,4,8,10-tetroxaspiro (5.5) undecane in accordance with the following equation:

$$C(CH_2OH)_4 + 2RCH(OR')_2 \xrightarrow{catalyst}$$

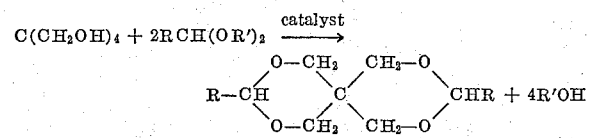

The spiro compound is separated from the alcohol byproduct, dipentaerythritol and other impurities by any suitable means, e.g. distillation, filtration and washing, solvent extraction, crystallization, etc., and is then hydrolyzed to form regenerated pentaerythritol and an aldehyde which again are separated by suitable means such as those mentioned above.

It has been found that acetaldehyde diethylacetal, i.e., "acetal," is a particularly suitable compound for the purification of pentaerythritol. It is an easily handled liquid which reacts readily with pentaerythritol to form 3,9-dimethyl-2,4,8,10-tetroxaspiro (5.5) undecane, and ethanol, the latter being easily removed by distillation. The spiro compound may then be hydrolyzed to form pure pentaerythritol and acetaldehyde which again is easily separated by distillation.

The following example illustrates the purification of pentaerythritol with an acetal.

EXAMPLE XI

A mixture of 187.8 parts by weight of freshly distilled acetaldehyde diethylacetal, i.e. "acetal," 102.9 parts of commercial pentaerythritol containing 7 to 8 percent by weight of dipentaerythritol as an impurity, and 4.31 parts of p-toluenesulfonic acid monohydrate as a catalyst were refluxed until homogeneous and for 2 hours thereafter, for a total refluxing time of 3 hours. Volatile byproduct and impurities were removed on a steam bath and the residue was vacuum distilled. The distillate was then vacuum distilled two more times. The yield was 50.3 parts of 3,9-dimethyl-2,4,8,10-tetroxaspiro (5.5) undecane which had a boiling point of 113.0° C. at 18 mm. Hg pressure and a refractive index of $N_D^{25} = 1.4502$.

The infrared spectrum showed no hydroxyl groups present.

A mixture of 65.8 parts of 3,9-dimethyl-2,4,8,10-tetroxaspiro (5.5) undecane obtained as described above and 560 parts of water were heated to boiling, and 170 parts of concentrated hydrochloric acid were then added. Steam distillation of the mixture was immediately begun. After 3½ hours of distilling with steam, the reaction mixture was evaporated to about one-third of its original volume, cooled in ice and the solid product filtered and air dried. The solid material was recrystallized from 100 parts of water to give 32.1 parts of pentaerythritol melting at 263.0–264.5° C. which was substantially free of dipentaerythritol.

It is to be understood that the foregoing detailed description is given merely by way of illustration and that many variations may be made therein without departing from the spirit of our invention.

This application is a continuation-in-part of our application Serial No. 782,885, filed December 24, 1958.

Having described our invention, what we desire to secure by Letters Patent is:

1. A linear polycarbonamide consisting essentially of recurring units having the structure

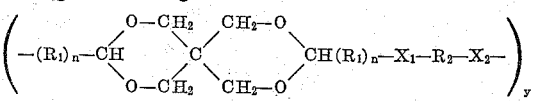

wherein $n$ is an integer from 0 to 1; $X_1$ and $X_2$ are

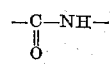

groups; $R_1$ and $R_2$ are divalent radicals having up to 20 carbon atoms, selected from the group consisting of arylene, alkylene, alkarylene, aralkylene and organic radicals having hydrocarbon ends linked together by a hetero atom of the group consisting of oxygen and sulfur; and $y$ is a whole number of at least 3, indicating the degree of polymerization.

2. The linear polycarbonamide of claim 1, wherein $R_2$ is a divalent 3,9 bis (alkylene) 2,4,8,10 tetroxaspiro (5.5) undecane radical, said alkylene groups having up to 20 carbon atoms.

3. The linear polycarbonamide of claim 5, wherein said diamine is a mixture of an aliphatic and an aromatic diamine, each of said diamines having up to 20 carbon atoms.

4. A linear polycarbonamide of a diamine and a dicarboxylic acid, said polycarbonamide consisting essentially of recurring units having the structure

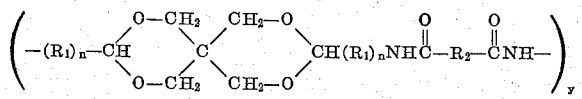

wherein $n$ is an integer from 0 to 1, $R_1$ and $R_2$ are divalent radicals having up to 20 carbon atoms, selected from the group consisting of arylene, alkylene, alkarylene, aralkylene and organic radicals having hydrocarbon ends linked together by a hetero atom of the group consisting of oxygen and sulfur; and $y$ is a whole number of at least 3, indicating the degree of polymerization.

5. A linear polycarbonamide of a diamine and a dicarboxylic acid, said polycarbonamide consisting essentially of recurring units having the structure

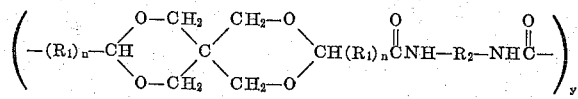

wherein $n$ is an integer from 0 to 1, $R_1$ and $R_2$ are divalent radicals having up to 20 carbon atoms, selected from the group consisting of arylene, alkylene, alkarylene, aralkylene and organic radicals having hydrocarbon ends linked together by a hetero atom of the group consisting of oxygen and sulfur; and $y$ is a whole number of at least 3, indicating the degree of polymerization.

6. A linear polycarbonamide consisting essentially of recurring units having the structure

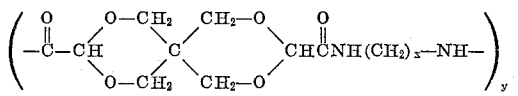

wherein $x$ is a whole number from 2 to 20 and $y$ is a whole number of at least 3, indicating the degree of polymerization.

7. Fiber-forming linear polycarbonamides consisting essentially of recurring units having the structure

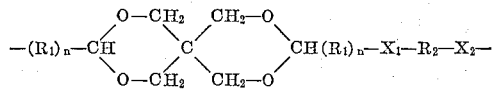

where $n$ is an integer from 0 to 1; $X_1$ and $X_2$ are

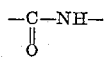

groups, $R_1$ is an alkylene radical having up to about 7 carbon atoms; and $R_2$ is a divalent radical having up to 20 carbon atoms, selected from the group consisting of arylene, alkylene, alkarylene, aralkylene, and organic radicals having hydrocarbon ends linked together by a hetero atom of the group consisting of oxygen and sulfur.

8. A salt of the formula

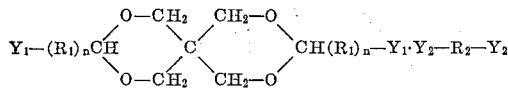

where $n$ is an integer from 0 to 6, where $Y_1$ and $Y_2$ are selected from —NH$_2$ and —COOH, and $Y_1$ and $Y_2$ are different, $R_1$ and $R_2$ are divalent radicals having up to 20 carbon atoms, selected from the group consisting of arylene, alkylene, alkarylene, aralkylene and divalent organic radicals having hydrocarbon ends linked together by a hetero atom of the group consisting of oxygen and sulfur.

9. A mixture of the salt set forth in claim 8, and a salt of an aliphatic dicarboxylic acid and an organic diamine selected from the group consisting of aromatic diamines, aliphatic diamines and heterocyclic diamines, where the hetero atoms are selected from the group consisting of oxygen and sulfur, said dicarboxylic acid and said diamine having up to 20 carbon atoms.

10. The linear polycarbonamide of claim 5, wherein said dicarboxylic acid has the structure

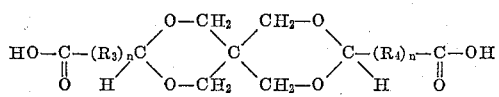

where $n$ is an integer from 0 to 1, and $R_3$ and $R_4$ are each alkylene radicals having up to about 7 carbon atoms.

11. The linear polycarbonamide of claim 5, wherein said dicarboxylic acid has the structure

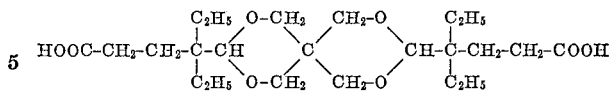

12. The linear polycarbonamide of claim 5, wherein said dicarboxylic acid has the structure

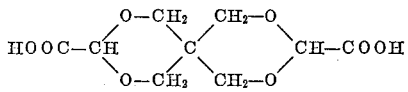

13. A fiber-forming linear polycarbonamide consisting essentially of recurring units having the structure

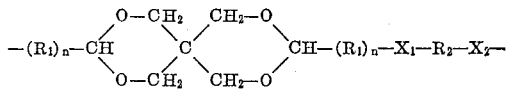

where $X_1$ and $X_2$ are

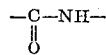

groups, where $n$ is an integer from 0 to 1, and $R_1$ and $R_2$ are each alkylene radicals, $R_1$ having up to about 7 carbon atoms and $R_2$ having at least 5 carbon atoms and up to about 13 carbon atoms.

14. The polycarbonamide of claim 13, wherein said polycarbonamide has an average molecular length in the linear polymer chain of at least about 1000 Angstrom units and a softening point of above about 200° C.

15. A linear polycarbonamide as recited in claim 11 wherein said diamine is decamethylene diamine.

16. A linear polycarbonamide as recited in claim 12 wherein said diamine is decamethylene diamine.

17. The fiber-forming linear polycarbonamides of claim 7, wherein the recurring units have the structure:

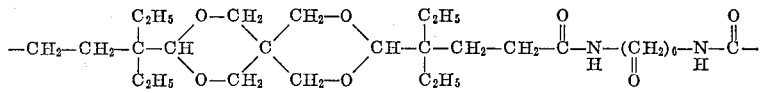

18. The fiber-forming linear polycarbonamides of claim 7, wherein the recurring units have the structure:

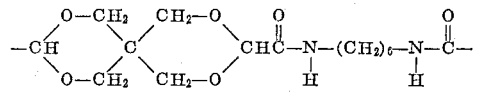

References Cited in the file of this patent
UNITED STATES PATENTS

| | | |
|---|---|---|
| 2,358,697 | Filbert | Sept. 19, 1944 |
| 2,389,662 | Fisher et al. | Nov. 27, 1945 |
| 2,415,021 | Morey | Jan. 28, 1947 |
| 2,441,602 | Snow et al. | May 18, 1948 |
| 2,606,907 | Blicke | Aug. 12, 1952 |
| 2,680,730 | Martin | June 8, 1954 |
| 2,696,482 | Pease | Dec. 7, 1954 |
| 2,790,788 | Kamlet | Apr. 30, 1957 |
| 2,864,852 | Jones | Dec. 16, 1958 |
| 2,945,008 | Caldwell et al. | July 12, 1960 |